(12) United States Patent
Luick

(10) Patent No.: US 6,978,361 B2
(45) Date of Patent: Dec. 20, 2005

(54) EFFECTIVELY INFINITE BRANCH PREDICTION TABLE MECHANISM

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/251,047

(22) Filed: Sep. 20, 2002

(65) Prior Publication Data

US 2004/0059899 A1    Mar. 25, 2004

(51) Int. Cl.[7] .............................................. G06F 9/00
(52) U.S. Cl. ...................................... 712/240; 712/239
(58) Field of Search ................................. 712/240, 239

(56) References Cited

U.S. PATENT DOCUMENTS

| | | | |
|---|---|---|---|
| 5,774,710 A * | 6/1998 | Chung ......................... | 712/238 |
| 5,822,577 A * | 10/1998 | Ekanadham et al. ......... | 712/240 |
| 6,178,498 B1 * | 1/2001 | Sharangpani et al. ........ | 712/239 |
| 6,351,796 B1 * | 2/2002 | McCormick et al. ........ | 711/204 |
| 6,425,075 B1 * | 7/2002 | Stiles et al. .................. | 712/239 |
| 6,438,659 B1 * | 8/2002 | Bauman et al. .............. | 711/141 |
| 6,516,409 B1 * | 2/2003 | Sato ............................. | 712/239 |
| 6,553,488 B2 * | 4/2003 | Yeh et al. .................... | 712/239 |

\* cited by examiner

*Primary Examiner*—Eric Coleman
(74) *Attorney, Agent, or Firm*—Bockhop & Associates LLC

(57) ABSTRACT

In a method for predicting whether a branch will be taken when a computational circuit executes a conditional branch instruction, a branch prediction field is associated with the conditional branch instruction. The branch prediction field includes at least a first state and a different second state. Upon accessing the conditional branch instruction, if the branch prediction field is in the first state the conditional branch instruction is prepared to execute as though the branch will result. If the branch prediction field is in the second state, the conditional branch instruction is prepared to execute as though the branch will not result.

6 Claims, 1 Drawing Sheet

EFFECTIVELY INFINITE BRANCH PREDICTION TABLE MECHANISM

BACKGROUND OF THE INVENTION

1. Field of the Invention

The present invention relates to computational circuits and, more specifically, to a circuit that predicts whether a conditional branch is taken.

2. Description of the Prior Art

Many modern computing systems use a processor having a pipelined architecture to increase instruction throughput. In theory, pipelined processors can execute one instruction per machine cycle when a well-ordered, sequential instruction stream is being executed. This is accomplished even though the instruction itself may implicate or require a number of separate microinstructions to be executed. Pipelined processors operate by breaking up the execution of an instruction into several stages that each require one machine cycle to complete. Latency is reduced in pipelined processors by initiating the processing of a second instruction before the actual execution of the first instruction is completed. In fact, multiple instructions can be in various stages of processing at any given time. Thus, the overall instruction execution latency of the system (which, in general, can be thought of as the delay between the time a sequence of instructions is initiated, and the time it is finished executing) can be significantly reduced.

Pipelining works well when program execution follows a sequential flow path follwing a sequential model of program execution, in which each instruction in a program is the one immediately in memory following the instruction just executed. A critical requirement and feature of programs, however, is that they have the ability to "branch" or re-direct program execution flow to another set of instructions. Using branch instructions, conditional transfer of control can be made to some other path in the executing program different from the current one. However, this path does not always coincide with the next immediate set of instructions following the instruction that was just executed.

Branch instructions can occur arbitrarily within any particular program, and it is not possible to predict with certainty ahead of time whether program flow will be re-directed. Various techniques are known in the art for guessing about the outcome of a branch instruction, so that, if flow is to be directed to another set of instructions, the correct target address can be pre-calculated, and a corresponding set of data can be prefetched and loaded in advance from memory to reduce memory access latencies.

Sometimes, however, the guess about the branch outcome is incorrect, and this can cause a "bubble," or a pipeline stall. A bubble or stall occurs when the pipeline contains instructions that do not represent the desired program flow (i.e., such as from an incorrectly predicted branch outcome). A significant time penalty is thus incurred from having to squash the erroneous instruction, flush the pipeline and re-load it with the correct instruction sequence. Depending on the size of the pipeline, this penalty can be quite large.

Various mechanisms have been proposed for minimizing the actual execution time latency for branch instructions. For example, one approach is to compute the branch address while the branch instruction is decoded. This can reduce the average branch instruction cycle, but comes at the cost of an additional address adder that consumes additional area and power.

Another approach uses a target instruction history buffer. An example of this is shown in U.S. Pat. Nos. 4,725,947, 4,763,245 and 5,794,027 incorporated by reference. In this type of system, each target instruction entry in a branch history table is associated with a program counter of a branch instruction executed in the past. When a branch is executed, an entry is filled by the appropriate target instruction. The next time when the branch is in the decoding stage, the branch target instruction can be prepared by matching the program counter to such entry in the branch history table. To increase the useful hit ratio of this approach, a large number of entries must be kept in the table. This requires an undesirable amount of silicon area and power. Moreover, the matching mechanism itself can be a potential source of delay.

Therefore, there is a need for a system of predicting branches that provides a branch indicator for every conditional branch instruction.

SUMMARY OF THE INVENTION

The disadvantages of the prior art are overcome by the present invention which, in one aspect, is a method for predicting whether a branch will be taken when a computational circuit executes a conditional branch instruction. A branch prediction field is associated with the conditional branch instruction. The branch prediction field includes at least a first state and a different second state. Upon accessing the conditional branch instruction, if the branch prediction field is in the first state the conditional branch instruction is prepared to execute as though the branch will result. If the branch prediction field is in the second state, the conditional branch instruction is prepared to execute as though the branch will not result. The process generates a branch prediction.

In another aspect, the invention is an apparatus for predicting whether a branch will be taken when a computational circuit executes a conditional branch instruction. A branch prediction field is associated with the conditional branch instruction. The branch prediction field has a first state and at least one second state. A circuit prepares to execute the conditional branch instruction as though the branch will result if the branch prediction field is in the first state upon accessing the conditional branch instruction. The circuit prepares to execute the conditional branch instruction as though the branch will not result if the branch prediction field is in the second state.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
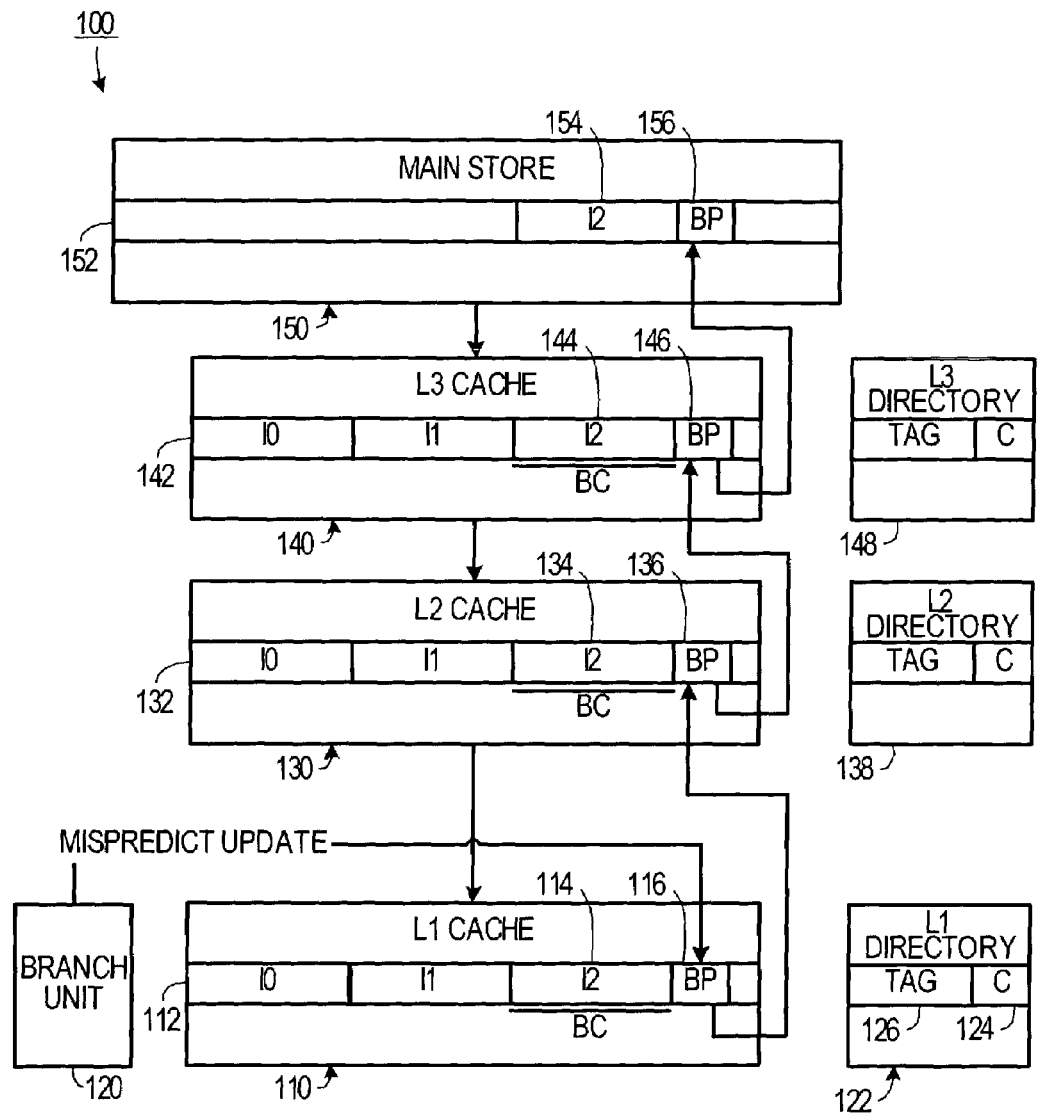
FIG. 1 is a block diagram showing a hierarchical instruction memory according to one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, in one embodiment of the invention, a plurality of hierarchical instruction memories 100 includes an L1 cache 110, an L2 cache 130, an L3 cache 140 and a main memory 150. While three levels of cache are shown, it is understood that the invention may be embodied using fewer levels of cache or more levels of cache. Furthermore, the invention need not be embodied in main memory 150 or could be embodied in an external memory, such as a disk drive or other direct access storage device. Thus, the invention may be embodied to many of the types of memory configurations generally known to the art of computer architecture. The L1 cache 110 stores a subset of the instructions stored in the L2 cache 130, which stores a subset of the instructions in the L3 cache 140. Similarly, the L3 cache 140 stores a subset of the instructions stored in the main memory 150.

The L1 cache 110 is the lowest-order cache shown, whereas the L3 cache 140 is the highest-order cache shown. Each time that an instruction is not found in a lower order cache, it is retrieved from the next higher-order cache (or main memory) in which the instruction is found. Once the instruction is retrieved from the higher-order cache, it is written to the lower-order cache and overwrites the cache line that has been unused for the longest period of time.

Each cache 110, 130, 140 includes a plurality of cache lines (e.g. 112, 132, 142, respecitively). Each cache 110, 130, 140, also has associated therewith a cache directory table 122, 138, 148, respectively. The cache directory tables 122 for the L1 cache 110 includes a tag field 126, which indicates the address of a cache line 112 in the L1 cache 110, and a change bit 124, which indicates if the cache line 112 corresponding to the tag field 126 has been changed since the last time that the cache line 112 was overwritten. The L2 cache 130 and the L3 cache 140 also have associated cache directories 138, 148.

A conditional branch instruction 114 stored in a cache line 112 of an L1 cache 110 is directly associated with a branch predict field 116. The branch predict field 116 holds a value that indicates whether the branch in the conditional branch instruction 114 is likely to be taken upon execution. For example, if the branch predict field 116 is a one-bit field, then a "0" might indicate that the branch is predicted not to be taken, whereas a "1" indicates that the branch is predicted to be taken. The data in the branch predict field 116 is used by the processor (not shown) to fetch any data that will be necessary if the branch prediction is correct.

Once the conditional branch instruction 114 is actually executed, a branch unit 120 evaluates whether the prediction is correct by comparing the branch result to the prediction. If the branch prediction is incorrect, the branch unit 120 will update the branch predict field 116 to reflect the latest execution of the conditional branch instruction 114. For example, when the branch predict field is the one-bit field discussed above, if the field contains a "1," indicating that the prediction is that the branch will be taken, but when the branch is not taken, the branch evaluation unit 120 will overwrite the branch prediction field 116 with a "0." Thus, the next time the conditional branch instruction 116 is executed, the prediction will be that the branch will not be taken.

When the branch predict field 116 in the L1 cache 110 is overwritten by the branch evaluation unit 120, the change bit 124 in the corresponding cache directory table 122 is asserted. When the cache line 112 is subsequently overwritten, the system examnines the change bit 124 and, if it is asserted, then the system will copy the branch predict field 116 in the L1 cache 110 into the branch predict field of the corresponding cache line 132 of the L2 cache 130. This process will also happen when the cache line 132 in the L2 cache 130 is overwritten and when the cache line 142 in the L3 cache is overwritten. Thus, as a conditional branch instruction is overwritten in the memory hierarchy 100, the change to the branch predict field 116 will propagate bach through the hierarchy to the corresponding branch predict field 136 in the L2 cache 130, then to the branch predict field 146 in the L3 cache 140, and eventually to the branch predict field 156 in the main memory 150.

This has the practical effect of providing an essentially infinite size branch prediction table in that every branch instruction in main memory has a ling-lived dynamic branch direction indication provided for it. This large table is cached along with the associated instructions on the normal demand basis. Because the instruction set uses only a small portion of main memory, one benefit of the invention is that it provides an essentially infinite branch prediction table at the cost of only a few bits per cache line in the cache hierarchy.

When the branch predict field 136 is a multiple-bit field, the branch prediction can be based on whether the value of the field is greater or less than a threshold. For example, if the branch predict field 136 includes three bits, the value in the field could range from zero (000) through seven (111). Each time the prediction is correct, the branch predict field 136 is modified in a first way, whereas each time the prediction is incorrect, the branch predict field 136 is modified in a second way. For example, the first way could include incrementing the value by on for each correct prediction, up to seven, and the second way could include decrementing the value for each mis-prediction, down to zero. The value in the branch predict field 136 is compared to a threshold (e.g., five) and the branch prediction is that the branch will be taken if the value is greater than the threshold and not taken if the value is less than or equal to the threshold. In this manner experience over several executions of the conditional branch instruction influences the prediction.

Figure 2:
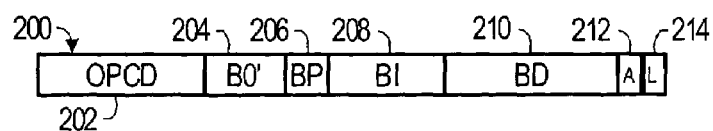
FIG. 2 is a block diagram of an instruction according to one embodiment of the invention.

As shown in FIG. 2, an instruction 200 formatted according to the invention could include an opcode field 202, a branch operation field 204 that indicates the type of branch to be taken, a branch predict field 206, a condition register bit designation field 208 that indicates which bit in a condition register to test in determining whether to branch, a branch displacement field 210 that indicates that displacement of the branch (or an absolute address to branch to), an absolute address bit 212 that indicates whether the value in the branch displacement field 210 is a displacement or an absolute address, and a link bit 214 indicates that the processor is to do a branch and link operation. This instruction format is similar to the standard instruction formats of many reduced instruction set processors.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method for predicting whether a branch will be taken when a computational circuit executes a conditional branch instruction, comprising the steps of:
   a. associating a branch prediction field with the conditional branch instruction, the branch prediction field including at least a first state and a different second state;
   b. upon accessing the conditional branch instruction, preparing to execute the conditional branch instruction as though the branch will result if the branch prediction field is in the first state and preparing to execute the conditional branch instruction as though the branch will not result if the branch prediction field is in the second state, thereby generating a branch prediction;
   c. determining an actual branch result, based on the conditional branch instruction;
   d. comparing the branch prediction to the actual branch result;
   e. if the branch prediction is different from the actual branch result, modifying the branch prediction field in a first way;
   f modifying the branch prediction field in a second way, different from the first way, if the branch prediction identical to the actual branch result; and
   g. modifying a change bit in a cache directory when the branch prediction field has been modified,
   wherein the conditional branch instruction is resident in a lower-order memory, the method further comprising the step of modifying the branch prediction field in a corresponding higher-order memory when the branch instruction resident in the lower-order memory is written over and when the change bit has been modified.

2. An apparatus for predicting whether a branch will be taken when a computational circuit executes a conditional branch instruction, comprising:
   a. a branch prediction field associated with the conditional branch instruction, the branch prediction field having a first state and at least one second state;
   b. a circuit that, upon accessing the conditional branch instruction, prepares to execute the conditional branch instruction as though the branch will result if the branch prediction field is in the first state and that prepares to execute the conditional branch instruction as though the branch will not result if the branch prediction field is in the second state;
   c. a branch evaluation unit that determines if the branch prediction field indicates a correct branch prediction and, if not, modifies the branch prediction field according to the correct branch prediction;
   d. a higher-order instruction memory;
   e. a lower-order instruction memory; and
   f. a circuit that causes the branch prediction field corresponding to the conditional branch instruction in the higher-order instruction memory to be written with a value in the branch prediction field corresponding to the conditional branch instruction in the lower-order instruction memory when the conditional branch instruction in the lower-order instruction memory is overwritten: and
   g. a directory table associated with the lower-order memory, the directory table including a change bit, wherein writing to the branch prediction field in the higher-order memory occurs when the change bit has been set to a predetermined value.

3. The apparatus of claim 2 wherein the higher-order instruction memory comprises a cache memory.

4. The apparatus of claim 2 wherein the higher-order instruction memory comprises a main memory.

5. The apparatus of claim 2 wherein the higher-order instruction memory comprises a remote memory.

6. The apparatus of claim 2 wherein the lower-order instruction memory comprises a cache memory.

* * * * *